US007949566B2

(12) United States Patent
Fogelson

(10) Patent No.: US 7,949,566 B2
(45) Date of Patent: May 24, 2011

(54) METHOD AND SYSTEM FOR CREATING AD-BOOKS

(76) Inventor: Bruce A. Fogelson, Chicago, IL (US)

( * ) Notice: Subject to any disclaimer, the term of this patent is extended or adjusted under 35 U.S.C. 154(b) by 1190 days.

(21) Appl. No.: 11/557,664

(22) Filed: Nov. 8, 2006

(65) Prior Publication Data

US 2007/0088608 A1    Apr. 19, 2007

Related U.S. Application Data

(63) Continuation-in-part of application No. 09/885,970, filed on Jun. 21, 2001.

(51) Int. Cl.
*G06Q 30/00* (2006.01)
*H04N 7/10* (2006.01)
*H04N 7/025* (2006.01)

(52) U.S. Cl. ............... 705/14.52; 705/14.64; 725/32

(58) Field of Classification Search .......... 705/10, 705/14.52, 14.64; 725/32
See application file for complete search history.

(56) References Cited

U.S. PATENT DOCUMENTS

| | | | | |
|---|---|---|---|---|
| 5,546,303 | A * | 8/1996 | Helbling | 705/30 |
| 5,555,497 | A * | 9/1996 | Helbling | 705/14.1 |
| 5,663,547 | A * | 9/1997 | Ziarno | 235/380 |
| 5,696,366 | A * | 12/1997 | Ziarno | 235/380 |
| 5,724,518 | A * | 3/1998 | Helbling | 705/1.1 |
| 6,408,278 | B1 * | 6/2002 | Carney et al. | 705/14.73 |
| 6,947,921 | B2 * | 9/2005 | Notargiacomo et al. | 1/1 |
| 7,076,458 | B2 * | 7/2006 | Lawlor et al. | 705/35 |
| 7,165,039 | B2 * | 1/2007 | Seet et al. | 705/13 |
| 7,315,826 | B1 * | 1/2008 | Guheen et al. | 705/7 |
| 7,343,317 | B2 * | 3/2008 | Jokinen et al. | 705/14.64 |
| 7,359,944 | B2 * | 4/2008 | An | 709/206 |
| 7,376,582 | B2 * | 5/2008 | Seet et al. | 705/14.73 |
| 7,509,270 | B1 * | 3/2009 | Hendricks et al. | 705/26 |
| 7,721,337 | B2 * | 5/2010 | Syed | 726/26 |
| 7,769,636 | B1 * | 8/2010 | Kamiya | 705/26 |
| 2002/0049816 | A1 * | 4/2002 | Costin et al. | 709/206 |
| 2002/0052756 | A1 * | 5/2002 | Lomangino | 705/1 |
| 2002/0073026 | A1 * | 6/2002 | Gruber et al. | 705/39 |
| 2002/0162106 | A1 * | 10/2002 | Pickover et al. | 725/42 |
| 2002/0188532 | A1 * | 12/2002 | Rothstein | 705/29 |
| 2005/0075971 | A1 * | 4/2005 | Delaney | 705/38 |
| 2005/0156902 | A1 * | 7/2005 | McPherson et al. | 345/173 |
| 2005/0197894 | A1 * | 9/2005 | Fairbanks et al. | 705/14 |
| 2006/0026056 | A1 * | 2/2006 | Weiner et al. | 705/10 |
| 2006/0230135 | A1 * | 10/2006 | Wolfston et al. | 709/224 |
| 2006/0247971 | A1 * | 11/2006 | Dresden et al. | 705/14 |
| 2007/0021973 | A1 * | 1/2007 | Stremler | 705/1 |

(Continued)

*Primary Examiner* — John G Weiss
*Assistant Examiner* — Adam Chornesky
(74) *Attorney, Agent, or Firm* — Husch Blackwell LLP

(57) ABSTRACT

A method and apparatus and format and and form are provided for preparing ad-books or related print or publishing for an organization or organizations or a plethora of organizations over a communications network. The method includes preparing an ads or messages at a user terminal connected to the communications network. The method further includes processing the "ad" or message at a server connected to the communications network for placing the "ad" or message in an "ad-book" or printing or other publication. The method further includes an automated "ad-book" format or form for the soliciting and obtaining ads or messages which provides methods for collecting ad/message pricing, content, layout, billing and information for ad/message for "ad-book" and related printing or publishing. The method, apparatus, format or form are believed particularly useful to assist and consolidate the efforts of non-profit, charity and similar organizations who, though they may differ in many ways, all rely on ad-books and similar print and publications for their fundraising efforts.

27 Claims, 5 Drawing Sheets

U.S. PATENT DOCUMENTS

| | | |
|---|---|---|
| 2007/0128899 A1* | 6/2007 | Mayer ............................ 439/152 |
| 2007/0136255 A1* | 6/2007 | Rizzo et al. ........................ 707/3 |
| 2007/0233562 A1* | 10/2007 | Lidwell et al. ................... 705/14 |
| 2008/0005017 A1* | 1/2008 | Poster ............................ 705/39 |
| 2008/0059256 A1* | 3/2008 | Lynch ............................... 705/7 |
| 2008/0071704 A1* | 3/2008 | Ring et al. .................... 705/36 T |
| 2009/0216623 A1* | 8/2009 | Hendricks et al. .............. 705/10 |

* cited by examiner

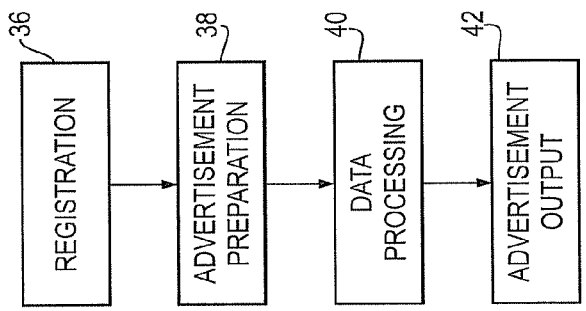
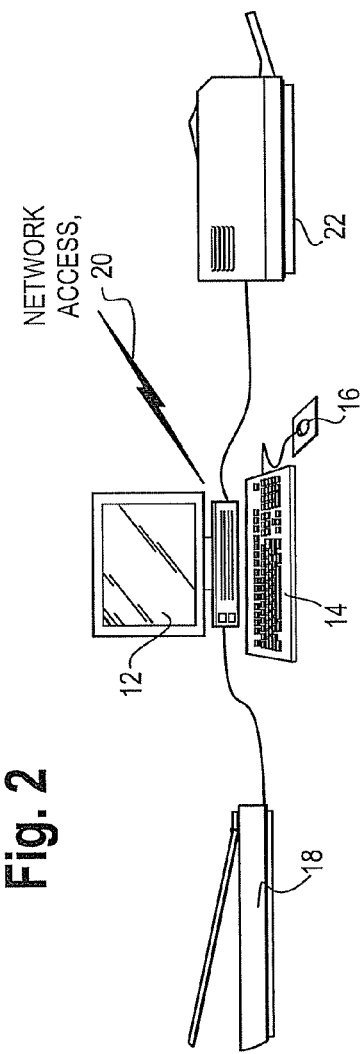
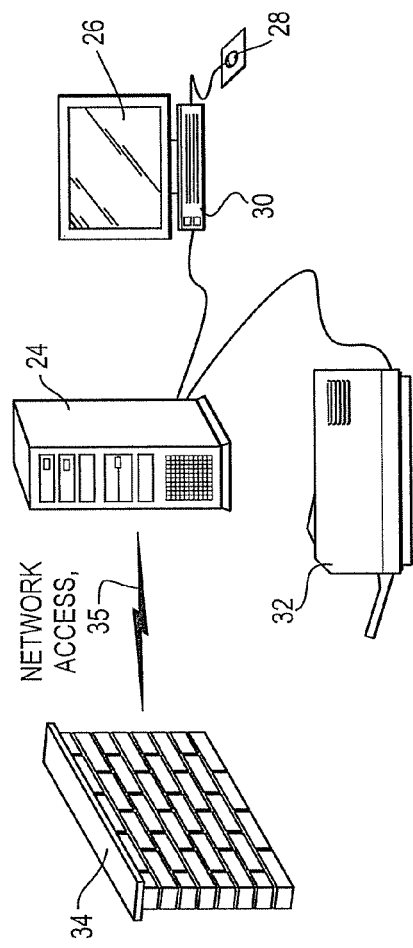

Fig. 5a

(NAME) [Browse] [Select]

123 Main St. St.  Ph: 123-456-7890   *AdBookOnLine.com*
Normal, IL 12345  Fx: 123-456-7890

A safe, direct deposit, direct to print, online ad book fundraising facilitator for your group or organization
Church AdBook.org | SchoolAdBook.org | SportsAdBook.org | HighSchoolAdBook.org | CommunityAdBook.org

*First Name: _____   *Last Name: _____
Business Name: _____
Address: _____
*City: _____   *State: _____ *Zip: _____
*Phone Number: _____   Fax: _____
*Email: _____   *Password: _____
*Security Question: [Security Question]   *Answer: _____
(Your Email confirmation will be sent to this address.)

Ad Book Ad Maker

Your ad message and/or... Your Ad Layout/Design and/or... YourAd Image. Drag, Drop In, or Pick
Deadline for online ad art is June 16th, 2006

Select print ad size

| | | | | |
|---|---|---|---|---|
| Full Page | Gold Sponsor | $200.00 ○ | Standard Sponsor | $100.00 ○ |
| 1/2 Page | Gold Sponsor | $200.00 ○ | Standard Sponsor | $100.00 ○ |
| 1/4 Page | | $35.00 ○ | Business Card | $35.00 ○ |
| Patrons | | $20.00 ○ | Booster | $10.00 ○ |

Type, select, design your own message, ad, or sponsorship and/or attach your own art:

Ad Copy:

[Font Size]   [Style]   Select an Image   Select a Border

Upload Camera Ready Art: _____ [Browse] [Upload] [help]
IP Address of Ad: _____

Though we are delighted to provide graphic design services for you, Ads created online save Our organization time and money.

Online Ad

Post your 24/7 Online Ad - Virtual Ad Book directory by Name or Business

For 6 Months   $20.00 ○   For 12 Months   $10.00 ○

Name: _____   Email: _____

Number: _____   Website: _____

Fig. 5b

Category:: ____ [Type of Business] _____

Thanks, Dedications, Tell a Friend

Who can we thank for your support?   Friends Of: _____ ☐ _____

Forward a copy of your contribution to:   Name: _____   Email: _____

Pledge & Payment

Terms & Conditions Pledge Box:

| TERMS AND CONDITIONS FOR USE OF THE AD BOOK WEBSITE |

I agree to the Terms and Conditions ☐

Credit Card   Visa                    Ad Book Ad _____
Expiration Date _____            Online Ad _____
Card Number _____                Total _____
Cardholder Name _____

☐ Bill Me                                                    Submit — 124
                                                                    — 122
118 —
                    Additional Payment Methods
120 —

Print to Fax or Mail:
Chicago Home & Builder Foundation        - OR -       *Secure Payments by*
123 Main St. St.                                      PayPal
Normal, IL 12345                                      VISA Tell a Friend about the Ad Book Online
Powered by
*AdBookOnLine.com*

A safe, direct deposit, direct to print, online ad book fundraising facilitator for your group or organization
Church AdBook.org | SchoolAdBook.org | SportsAdBook.org | HighSchoolAdBook.org | CommunityAdBook.org terms & conditions   organization information   help

METHOD AND SYSTEM FOR CREATING AD-BOOKS

This application is a continuation-in-part of U.S. patent application Ser. No. 09/885,970 filed on Jun. 21, 2001 (pending).

BACKGROUND OF THE INVENTION

1. Field of the Invention

This invention relates generally to what are commonly known as "advertisement books" or more commonly referred to as "ad-books" or printings or other publications as frequently used by charities and not-for-profit organizations for fundraising, and more particularly, to the forms and computerized/automated preparation, production, publishing and management of ad-books and related print or publishing frequently used by charities and not-for-profit organizations for fund raising.

2. Related Art

Advertisement books (hereinafter "ad-books") and related print or publications are fundraising vehicles whereby members and supporters of an organization pay the organization to place an advertisement (hereinafter an "ad") or message in an organization's publication for the dual purpose of advertising and contributing to the group. Organizations that may use ad-books include charities, schools, teams, associations, clubs, professional organizations, lodges, unions, boards, fraternities, sisterhoods, causes, hospitals, homes, condoboards, synagogues, events, community groups, and political parties or candidates. Typically, an organization will solicit members and supporters to buy an "ad" or place a message in their "ad-book" or related print or publication and either sell or give away the ad-books or related print or publication as a fundraising tool. As a fundraising tool, "ad-books" (and related print or publications) are similar to group fundraisers such as award dinners, car washes, bake-sales, raffles, auctions, golf-outings, or similar events. Each such event offers members and supporters an excuse or opportunity to contribute and help the organization raise money as well as to participate in or be associated with an organization. An "ad-book" or related print or publication also offers the member or supporter the opportunity to be recognized by the organization or participate with a member, family or friend by being an incidental supporter in an "ad-book" or related print or publication, as opposed to being a "card-carrying" or dues paying member. Ad-books are often synonymous with or produced along with or in the form of dinner-programs, group directories, group calendars, raffles, auction-books, yearbooks, newsletters, or along with other simple content or events. In this way such print or other publication offers sponsorship opportunities for ads, listings, messages or other support and at a variety of rates and fees. It should be noted that the rate or fee charged in the nature of this not-for-profit sector is more attuned to the charitable giving, giving history, recognition of the charitable nature of the giver or of the members or supporters or the needs of the organization as opposed to the more commercial marketplace which places value on circulation and the more direct potential commercial results of the advertisement or the product or service.

Although "ad-book" ads or messages are viewed by advertisers as a deductible business expense, the "ad-book" advertisers are primarily members or supporters and their primary economic motivation most often is to make a contribution to the organization or to be recognized as philanthropic or to receive a generally positive social recognition as opposed to receiving quality or value for a purchase either of the "ad" or for any particular product or service. In fact, the pricing of an "ad" or message in an "ad-book" is rarely related to the typical economic considerations of a typical advertiser whereby the value of their advertisement would be based on the circulation of a given publication to the general public or a target market. The "ad-book" in this case is often not circulated beyond the group itself and is not often priced based on its circulation. Accordingly, the term "ad-book" and "ad-book advertiser" have meanings that are limited by the non-for-profit context of their uses herein.

Likewise, the "ad-book" has very little similarity in its content to a general circulation commercial publication. Most general circulation publications have content which is their appeal, and advertising which supports the publication's articles and editorial views or subjects. By contrast, "ad-books" have primarily ads. And the balance of the content of an "ad-book" or similar print or publication for an organization is by, for, or about the organization or its mission or charitable or not-for-profit works, and its members, supporters, or honorees. In brief, an "ad-book" for a typical organization focuses inward, on itself or the organization while a commercial publication typically focuses outward toward its intended public audience or targeted segment of the public.

In this sense, this type of "ad" for an organization's "ad-book" is based on the advertiser's desire to support the organization (or be seen among his/her peers as supporting). Often ad-books and related print or publications are a part of the social or philanthropic fabric of the charitable or not-for-profit community and allow members, supporters, and donors to be recognized for their contributions by ads or messages. For example, a large and generous donor may be recognized for its contribution by a prominent full-page, gold-leaf ad, while smaller donors may be acknowledged for a smaller half page "ad" or message and still smaller "gifts" or "donations" are priced to receive and provide an even smaller "ad" or message of a $\frac{1}{8}^{th}$ page or business card size or even a single line notation. "ad" pricing for ad-books is sometimes synonymous with "gift" or "donation" or similar terms, even though they are also direct payment for particular ads size and placement.

The "ad-book" may also be seen as a "roll of givers" that acts as a directory, establishes a pecking-order, and may even pressure others to donate. In this instance the names or recognition of members, supporters or donors to an "ad-book" may be recognized in lists, typically from the most generous to the least. Frequently such lists are broken down into groupings and/or given honorary names for each level. An example of such an "ad-book" or printing or publication would include a sequence of giving levels such as $1,000-$10,000, $500-$999, $250-$499, $100-$249 and under $100. Similarly, an example of names denoting higher levels of giving could include Diamond, Platinum, Gold, Silver, Bronze, etc. Another verbal example of levels is Chairman's Club, President's Club, Board Level or Member. There are numerous other verbal example categories of recognition and of giving levels depending widely upon the constituency of the given organization, its cause and the demographic of its community, to name just a few factors.

In this sense, ad-books give the advertiser the opportunity to be known as a benefactor and to help the community recognize its benefactors, great and small. But Ad-books are also believed to encourage giving and to offer a unique opportunity to boost giving or revenue to an organization beyond just giving, since, though thinly veiled as an ad, such ads can be treated as a business expense for advertising or with matching gifts, for members or supporters who are advertising, as opposed to other means of contribution to an organization.

The process of putting together an "ad-book" includes gathering advertisers, creating ads, collating ads, collecting money, issuing receipts, performing layout of content and graphics, finding prospective printers, bidding pre-print layout, bidding for printing services, contracting with a printer, proofreading, compiling content, pagination and printing and or publishing and distributing ad-books. Organizations that use ad-books as a fundraising vehicle often perform these tasks by organizing committees of volunteers. Many of these tasks may be performed by the organization or sent to one or more local businesses, such as graphic designers or printers, to assist with the production of the ad-books. In either case, the process is time consuming and very labor intensive for the organizations that use ad-books or similar print or publications as a fundraising vehicle. Further, since organizations generally do not collaborate or cooperate in their fundraising efforts, the economic benefit that arises from producing ad-books or other similar print or publications in large quantities for many different organizations is unavailable. Thus, a number of alternative fundraising ways are known and preferred to using ad-books such as holding an annual dinner or auction or event. But because groups or organizations appeal to their members on such special occasions and want to recognize their efforts, honorees or event, the "ad-book" techniques are often employed within such other related print or publishing (such as an outing, event or a dinner program) where "advertisers" are recognized as "sponsors". The above techniques are well known in the world of associations, not-for-profits, charity educational, and religious organizations, to name a few.

In the field of pure charity, we know of at least one known reference that describes a method of and device for streamlining, simplifying and inducing the giving of contributions or gift commitments by contributors or prospective gift givers that involves dispersing through a crowd of prospective contributors or gift givers a plurality of keyless, electronic contributions or gifts management devices for immediate entry of consecutive data comprising the identities of the contributors or gift givers making the monetary contribution commitments or monetary gift commitments.

Another known "charity" reference describes a method of capturing monetary donations or monetary gifts made by donors or gift givers at points in time and space in which said donors or gift givers are optimally motivated to make said donations or gifts, said donations or gifts being the donation or gift preferences of respective donors or gift givers. The method comprises inputting a multiplicity of sequences of data comprised of monetary donations or monetary gifts. The monetary donations or monetary gifts are made by a plurality of said respective donors or gift givers consecutively free of input of information unrelated to said respective monetary donations or monetary gifts at a multiplicity of distinct sites where said donations and gifts are being received.

Another known "non-ad" reference describes a central office that correlates charitable contributions made at vending stations in food service establishments which issue information carriers in return for charitable contributions which are receipts for the contribution and entitle the donor to a beverage dispensed from a machine responding to the information carrier. Yet another known reference describes a multiplicity of charitable collection stations with selectors for choosing the charity to which a contribution is destined, a change maker for issuing change if desired, a display for displaying information with respect to premiums available and contributions made, and a modem or other telecommunicator for two-way communications with a central station.

However, none of these known ways improves upon or streamlines the creation, publishing, and development of ads, ad-books or related print-jobs or publishing. In addition, none of these ways creates a new tool of a type of physical "form" to fill out that simultaneously offers to or collects members or supporters billing information for an "ad" or message and the advertisements or messages, themselves, for automated delivery to pre-print production or printing and financial information or funds for direct deposit or to automatically issue accounting statements such as billing, receipts or reports. Accordingly, a new method and system and tool or device for creating ad-books is needed.

Furthermore, there is no standardized method, system, tool, automated form or device to provide such services to a plethora of groups, charities and not-for-profit organizations for fundraising ad-books or related print or publication, and more particularly, to standardized computerized/automated preparation, production, publishing and management. The lack of previously known methods to support a plethora of organizations with ad-books is probably due to several key factors which are overcome by the proposed invention. First, there is a propensity for community groups to be insular and private and to jealously guard their membership information and the privacy of their members. It is therefore only ironic that the use of ad-books provides a rare event where such organizations permit, and even encourage a public display of members and supporters. An internet based system for ad-book fundraising (as under the claimed invention) can provide customizable interconnectivity as well as privacy protection for a plethora of organizations based on the same methods and tools. Second, organizations, large and small, can rely upon volunteer efforts and volunteered efforts, in which even a plethora of organizations, can be systematized using an internet based system. And, third, organizations and groups all engage in similar fund-raising activities. Their individual identity and cause is "their heart and sole" and thus they strongly self-associate and do not share methods or tactics. But the advent of the internet has provided a unique platform for even far-flung organizations to use universally accepted methods and techniques under the claimed invention. And the flexibility of the invention, coupled with the internet delivery system and methods to personalize the delivery of forms and facades can allow widely differing groups to engage in the nearly identical fund-raising ad-book, print and publication techniques showing their own "front-end" to members and supporters while the organizations benefit from the similar methods systems, tools, automated form or device to provide such service as computerized/automated preparation, production, publishing and management by the "back-end" provided by the invention and for shared fractions of the cost spread over numerous groups, large and small.

SUMMARY

A method and apparatus and forms are provided for preparing ad-books over a communications network. The method includes preparing an advertisement or message at a user terminal connected to the communications network and using a form or format that facilitates the transactions. The method further includes processing the advertisement or message at a server connected to the communications network for placing the advertisement or message in an "ad-book" or related printing or publication.

As a more specific example, a method and apparatus are provided for preparing an ad-book, print or publication for one of a plurality of charity or not-for-profit organizations. The method includes the steps of a member or supporter of the charity or not-for-profit organization accessing a website of the one of the plurality of charity or not-for-profit organizations and downloading a webpage from the website, the member or supporter activating a hyperlink on the webpage to download an interactive "ad-book" ad, message or contribution form of the charity or not-for-profit organization linked to a third-party "ad-book" print or publication manager and preparer, the member or supporter preparing an "ad" or message for inclusion within the ad-book, print or publication using the interactive contribution form and the third-party "ad-book" manager and preparer preparing and publishing the ad-book, print or publication with the prepared "ad" or message of the member or supporter on behalf of the organization.

One thing that all of these "ad-books" and related print and publications have in common is a "request for information" for placing ads from its members and supporters. Though each "request for information" is different, when compared among many, there are striking similarities and significant differences. This invention seeks to reconcile the similarities and overcome the differences with a technical solution heretofore not available or contemplated, other than as described herein.

The similarities of the "requests for information" include basic contact information of the member, supporter or "advertiser" such as name, address, phone, and the fact that they wish to participate in the "ad-book". An example of consistent, though not identical information, common among ad-books requests among differing organizations for ad-books or similar print or publications is the pricing or levels of giving, size and method of conveying the "ad" or message and the methods of payment. An example of information that is unique to each organization's "ad-book" request would be the organizations name, logo, contact information and mailing address.

To the best of our knowledge there is no standard "ad-book" request for information format nor is there any particular request for information used by any two groups. Each group seems to, simply enough, come up with their own format. Though "ad-book" requests for information may be similar, or even plagiarized from one group to another or adapted from local printers there is no common rule or tool to guide this very cloistered, parochial and private "industry".

Illustrated embodiments of the invention provide a common format using unique computer technology, automated form-making technology and the internet, which, together combine the common elements, make more flexible and responsive the similar elements and simply drop-in the features unique to each group or organization from a data-base of digital information kept for each individual group from the plethora of groups and organizations.

Historically, each organization had to process the requests for information using paper requests for information and had to do two additional key elements by hand in addition to handling and processing the form. The two key additional elements are the money deposit and accounting and the processing of the content and layout of the "ad" or message to prepare for printing or delivery to the printer. Typical requests for ads require the member or supporter who is placing an "ad" or message to attach or enclose payment, requiring separate processing by the Organization and or the organization's financial institution. Such processing included depositing payments, accounting, issuing billing or receipts in each instance and overall budgeting for the management, budgeting and tracking of the success of the total campaign.

Typical forms require the member or supporter placing an "ad" or message to attach or enclose the "ad" or message copy, camera-ready art, business card, photo or text with the form, requiring separate processing by the organization or its vendors. Such processing typically requires graphic design, pre-print layout, pagination and other print or publishing typical of ad-books or other related print or publishing jobs.

The invention provides a common form with the help of computer technology, form-making technology and the internet, which, together can make common the diverse elements of processing and take similar elements of processing of "ad-book" from each individual group and combine them with consolidated service providers in order to achieve economies of scale and efficiency without unreasonably reducing the unique identity or appeal of each organization or their cause. For instance, through a relatively common automated format the member or supporter can create their own ad, including graphic design and images (thus eliminating much of the pre-print-production costs of a $3^{rd}$ party graphic designer for many ads or messages). An automated "ad-book" format can automatically send funds, receipts or billing information or deposit funds directly into the organization's financial institution or provide accounting and track progress of the fund-raising efforts, or send automatic reminder or renewal notices. By combining accounting with pre-print layout, such a system can use automation and computer-driven rules to allow consistent and well regulated pagination so that more generous "full-page" ads are grouped in order and less expensive business card sized ads are grouped together.

Many other features and benefits are reasonably expected from this invention, e.g. automated renewal notices, multi-year "ad" placement, standardized yet flexible formats for data, ad/message content management, standardized "ad-book" features such as stock-sizes, covers, sizes, colors, table of contents formats, affinity group content, and celebrity endorsement; consolidated printing and print work bidding, consolidated advertising and account management, cross-ad-book advertising and demographic specific publication, automated up-selling techniques, frequency reminders, on-line publishing and directory services, lock-box collection, services and specialized accounting, reporting and receipts, which are typical of not-for-profit and political organizations. The use of a common or typical format for soliciting or the use of an electronic form such as can be conveyed over the internet offers many advantages such as saving postage, e-mailing larger pools of members and supporters, electronic processing of electronic forms, including graphic design features for on-line/on-the-fly graphic design of "ad-book" ads or messages and on-line payment.

Other embodiments, features, and advantages of the invention will be apparent to one with skill in the art of both organizations who rely on "ad-books" and similar print or publications for fund-raising as well as printers and graphic designers who have traditionally helped compile and publish such ad-books and related print publications and who may also benefit from more organized and automated pre-print production and delivery by organizations.

Other embodiments, features, and advantages of the invention will be apparent to one with skill in the art upon examination of the following figures and detailed description. It is intended that all such additional embodiments, features, and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

FIG. 2 illustrates an example user terminal of FIG. 1;

FIG. 3 illustrates an example "ad-book" server of FIG. 1;

FIG. 4 depicts a flow chart for creating ad-books using the system of FIG. 1;

FIGS. 5a-b depicts an example advertisement selection form of the system of FIG. 1.

DETAILED DESCRIPTION

Figure 1:
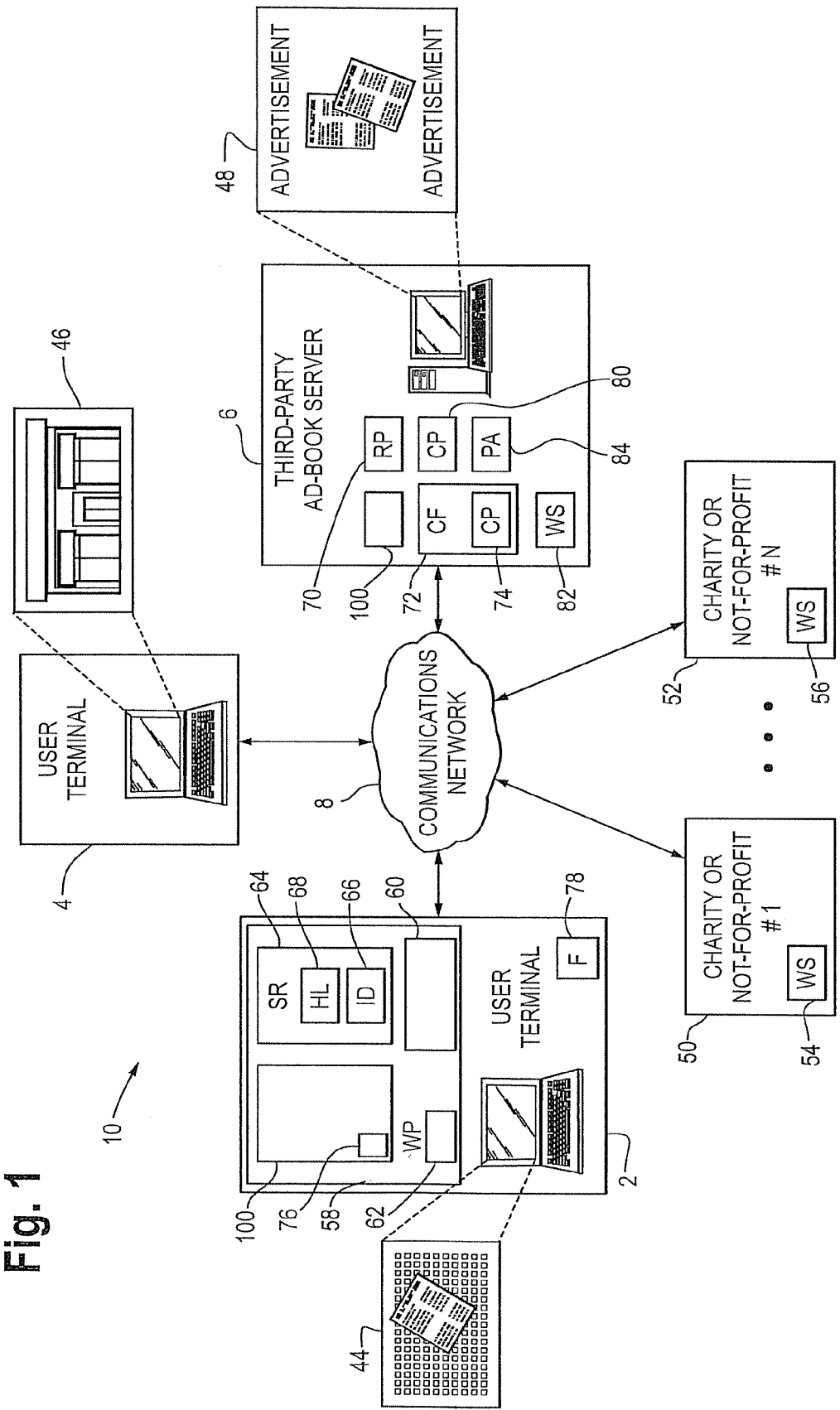
FIG. 1 depicts an "ad-book" preparation system in accordance with an embodiment of the invention.
Figure 6:
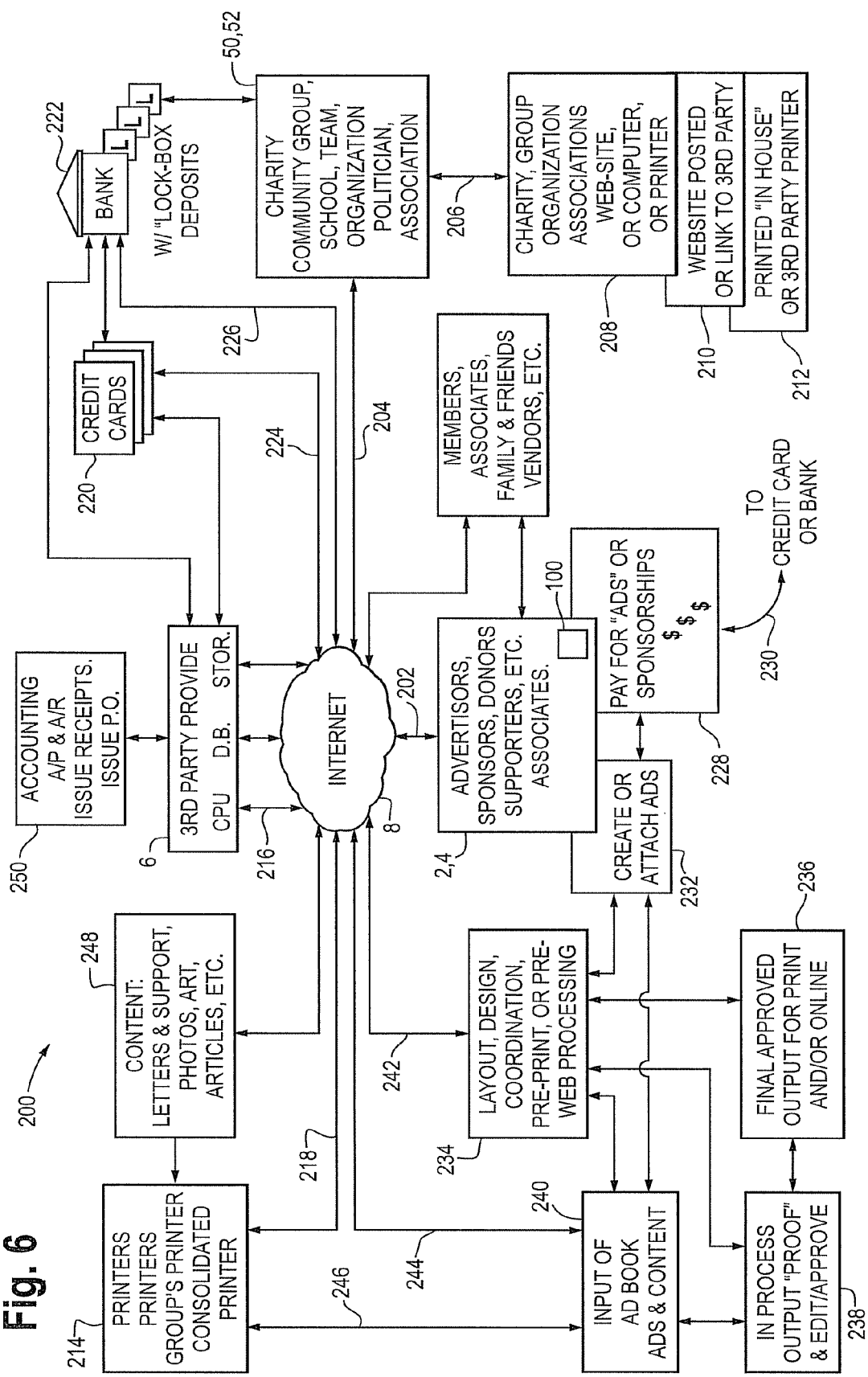
FIG. 6 is a schematic of processors of the system of FIG. 1.

FIG. 1 depicts a block diagram of an advertisement book (used herein as "ad-book"), print and publication preparation system 10 shown generally in accordance with an illustrated embodiment of the invention. FIG. 6 depicts an overall connection diagram of the software modules used to implement the system 10 of FIG. 1.

The system 10 may include a number of hosts 50, 52 operated by a charity or not-for-profit organizations and a third-party "ad-book" server 6. Each of the charity or not-for-profit hosts 50, 52 may support one or more websites 54, 56 for the benefit of the members and supporters of the charity or not-for-profit organization. Members and supporters of each of the charity or not-for-profit organizations may access the respective websites 54, 56 and make contributions to the charity and not-for-profit organization through a respective terminal 2, 4 of the member or supporter.

Upon accessing the websites 54, 56 of the respective charity or not-for-profit organization, the members and supporters 2, 4 may download one or more web pages 58 from the respective websites 50, 52 of the charities or not-for-profit organizations. Located on the web pages 58 may be a number of windows 60 with descriptive information (e.g., mission statements, operational objectives and achievements, donation instructions, etc.) about the charity or not-for-profit organization.

Also located on the web pages 58 may be a softkey 62 entitled MAKE CONTRIBUTION." Activation of the softkey 62 activates a subroutine 64 downloaded with the webpage 58. Activation of the subroutine 64 causes the subroutine to activate a hyperlink 68 that sends a message to the "ad-book" server 6. Included within the message is a request for a contribution form 100 and an identifier of the host 50, 52 (i.e., an identifier of charity or not-for-profit organization) from which the request originated.

Within the third-party server 6, a request processor 70 may receive and process the request. As a first step, the processor 70 may retrieve the identifier of the charity or not-for-profit organization to access a file 72 of the charity or not-for-profit organization and retrieve a set of contribution parameters 74. With the contribution parameters, the request processor 70 may construct an interactive contribution form 100 (FIGS. 5a-b).

As a first step in the construction of the contribution form 100, the request processor 70 may insert a name of the charity or not-for-profit organization in a display area 102 within the form. The request processor 70 may also insert a set of names 104 of customized levels of sponsorship of the charity or not-for-profit organization. As a final step, the request processor 70 may also attach a processing subroutine 76 to the form 100 and download the form 100 and attached subroutine 76 to the member or supporter 2, 4.

Alternatively, the form 100 may be pre-constructed and saved as a feature within each web page 58. In this case, the form 100 would be downloaded with the web page 58 from the website 54, 56 whenever a member or supporter 2, 4 visits the website 54, 56, although the size of the file (i.e., the form 100) would slow the downloading of the web page 58.

In general, a member or supporter of the charity or not-for-profit organization may use a user terminal 2, 4 to prepare an advertisement to be placed in an ad-book. An "ad-book" server 6 receives advertisement data via the form 100 from a user terminal 2, 4 via a communications network 8. In an illustrative embodiment, communications network 8 functions to carry information between the user terminals 2, 4 and the "ad-book" server 6 to facilitate the creation of ad-books. The communications network 8 may include circuit switched telephony as used in public switch telephone networks (PSTN) or data packet networks adhering to Internet Protocol (IP), frame relay, or Asynchronous Transfer Mode (ATM) protocols. In an illustrative embodiment, communications network 8 provides IP communication for user terminal 2, 4 and "ad-book" server 6.

As used herein, an advertiser includes members and supporters of an organization, e.g. charity, school, team, association, club, professional organization, lodge, union, board, fraternity, sisterhood, cause, hospital, home, condo-board, synagogue, event, community group, political party candidate, and volunteers and staff of the organization. For example, a local hardware store may be an advertiser since it may desire to support the local community group. Further, the advertiser may include representatives and agents of the members and supporters. For example, a marketing manager or a secretary for the marketing manager may be termed an "advertiser" for purposes of this application. Further yet, volunteers or members of the organization may serve as advertisers. For example, a local bakery may desire that the volunteers of the synagogue put together the advertisement on the bakery's behalf.

The user terminal 2, 4 functions to provide an interactive input apparatus for the creation of advertisements to be placed in ad-books. As used herein, the term "advertisement" in the context of an "ad-book", print or publication for a charity or not-for-profit organization includes announcements, statements, proclamations, public statements, posters, billboards, public notices, classified ads, want ads, commercials, flyers, brochures, and other information to be disseminated to the public. The advertisement may includes graphics, simple text, images, video clips, audio clips, and audiovisual information.

An embodiment of the present invention may be employed and used in conjunction with any computer system, such as a personal computer, a notebook computer, a personal digital assistant (PDA), a cellular telephone, or a mobile/wireless assistant or automatic teller machine (ATM) or automatic ticket dispenser. For example, as shown in FIG. 2, a user terminal 2, 4 may be a personal computer system including a monitor 12, a keyboard 14, a mouse 16, random access memory (RAM), storage in the form of a hard disk, a scanner 18, and network access 20 to the communications network 8. The personal computer may also include a floppy disk, a CD-ROM drive, read-only-memory, a modem, speakers, a camera, and a laser printer 22 as are well known in the art. In addition to a personal computer, the user terminal 2, 4 may be practiced using a network computer, a "dumb terminal" on a multi-user system, or an Internet or intranet computer, in which software is resident on the Internet or intranet, rather than stored on a hard disk on a personal computer. Further, the user terminal 2, 4 may either operate in a stand-alone mode or over a network.

The user terminal 2, 4 may be provisioned with computer operating software currently available on a number of platforms, such as Microsoft Windows, Apple MacOS and Sun Solaris. The computer system may be running Windows 98, Windows NT, or equivalent, Palm OS, WindowsCE, or equivalent or an operating system used on Apple or Sun Computers. An embodiment of the present invention is not limited to a particular operating system or computer system to function.

The user terminal 2, 4 allows an advertiser to prepare an advertisement by using the computer (as shown in FIG. 2) to display and edit a desired advertisement. A desired advertisement 44 is shown in FIG. 1 as it would be displayed on the monitor 12 of the user terminal 2. The user terminal 2, 4 may be provisioned with computer software currently available for the preparation of the advertisement or simple content. Computer software, such as Microsoft Office, Corel PageMaker and Adobe PhotoShop may be suitable for the preparation of a desired advertisement. Further, the user terminal 2, 4 may be used to connect with the "ad-book" server 6 to transmit the desired advertisement to the "ad-book" server 6 to be printed on a printer or to be formatted for display as an electronic ad-book.

In this context, the member or supporter may use the contribution form 100 in conjunction with the software to prepare the advertisement. The advertisement 44 may be created by the member or supporter and saved as a separate file 78 under an appropriate format (e.g., pdf) on the user terminal 2, 4.

The member or supporter may then access the contribution form 100 to submit the advertisement. For example, after adding identification information of the member or supporter in a first area 106 of the form 100, the member or user may activate a BROWSER softkey 108. Activation of the softkey 108 allows the member or supporter to view and identify one or more graphics and/or text files 78 within a window 107 for inclusion within the ad. Selection of the file 78 causes an image of the file to displayed in a window 109. The member or supporter may add text within another window 112 to create the finished ad 44. Alternatively, the member or supporter may enter an IP address within a window 113 of the file 44 that identifies a path through the communication system 8 through which the file 44 may be retrieved. Once the files have been identified, the member or supporter may activate an UPLOAD softkey 110.

The "ad-book" server 6 may function to perform processing for the creation of ad-books. It may provide user terminals 2, 4 with the ability to enter prepared content or advertisements or to prepare an advertisement for an ad-book via the electronic form 100. An embodiment of the "ad-book" server 6 may be employed and used in conjunction with any computer system, such as a personal desktop computer. For example, as shown in FIG. 3, an "ad-book" server 6 includes a web server system may include a monitor 26, a keyboard 30, a mouse 28, a processing unit 24, and network access 35 with a firewall 34 to the communications network 10. The web server may also include a floppy disk, a CD-ROM drive, read-only-memory, a modem, speakers, a camera, a zip drive and a laser printer 32 as are well known in the art. Optionally, the "ad-book" server may include a database for managing ad-books, user terminals 2, 4, advertisers, and advertisements.

The "ad-book" server 6 may be provisioned with computer operating software currently available on a number of platforms, such as Microsoft Windows, Apple MacOS and Sun Solaris. The computer system may be running Windows 98, Windows NT, or equivalent, Palm OS, WindowsCE, or equivalent or an operating system used on Apple or Sun Computers.

For example, once a form 100 is received, a consolidation processor 80 may receive the advertisement 44 and incorporate the advertisement 44 into the "ad-book", print or publication 48. If the form 100 is the first advertisement 44 received, then the advertisement 44 would simply be added to the file. If the advertisement 44 where one of many, then the advertisement 44 may be prioritized within the "ad-book, print or publication 48. For example, a member or supporter who submits an advertisement as a Gold Sponsor 104 may be inserted at a beginning of the "ad-book", print or publication. A Standard Sponsor may be relegated to an end of the "ad-book", print or publication.

Similarly, the consolidation processor 80 may assembly advertisements 44 based upon size. In this case, advertisement that occupy a full page would simply be appended based upon priority. One-half page advertisements 44 would be consolidated with another one-half page advertisements 44 or two one-fourth page advertisements 44.

In another illustrated embodiment of the present invention, the "ad-book" server 6 may be programmed as a web server adhering to the Active Server Pages specification to generate web pages for display on the user terminals 2, 4. An embodiment of the present invention is not limited to a particular operating system or computer system to function.

In operation, an embodiment of the present invention functions to allow advertisers at user terminals 2, 4 to produce advertisements for ad-books without the necessity of first accessing any website 54, 56 of a charity or not-for-profit organization. FIG. 4 is a flowchart illustrating an example flow of the functions performed by the "ad-book" server 6 in creating ad-books. Advertisers at user terminals 2, 4 may connect to a website 82 of the "ad-book" server 6 by accessing the Internet via the communications network 8 and entering a URL address relating to the "ad-book" server 6. An advertiser at a user terminal 2, 4 may register (see Block 36) with the "ad-book" server by entering information related to the ad-book, the organization, and the advertiser. With regard to the charity or not-for-profit organization, the member or supporter may activate a BROWSE softkey 114 and a list of charities or not-for-profit organizations registered with the server 6 may be displayed within a window 102. The member or supporter may select the charity or not-for-profit organization and activate the SELECT softkey 116.

The advertiser may enter the business name, address, and telephone number in a first text area 106. The advertiser at a user terminal 2, 4 may prepare an advertisement (see Block 38) by a number of different methods including by downloading an advertisement that has been previously prepared, filling in one of several standard forms, and composing an advertisement at the "ad-book" server 6 (see block 38). Downloading may include transmitting the previously prepared advertisement or standard form from the user terminal 2, 4 to the "ad-book" server 6 through the communications network 8. An advertiser may directly create an advertisement using applications software such as Microsoft Word, Corel PageMaker and Adobe PhotoShop. As mentioned, an example advertisement 44 prepared on the user terminal 2 and viewed on the monitor 12 of the user terminal 2 is shown in FIG. 1.

Alternatively, an advertisement may be composed at the "ad-book" server 6 by selecting choices relating to the advertisement including desired size, cost/fee, message, layout, and background from a web-based advertisement preparation tool. The web-based advertisement preparation tool may be executed at "ad-book" server 6 and may present choices relating to advertisement size, placement, cost/fee, layout, background and text to the user terminals 2, 4. For example, desired messages available for selection may include "Congratulations!" "Good Luck on the Fundraising," and "We Support You!" Further, messages may be personal or personalized so that the advertiser may input personal information such as a name. For example, personalized messages available for selection include "From Your Friends at _____",or "With Love From _____". Yet other messages may provide or allow for matching corporate giving. For example, an individual's "ad" or message which would include an approved "matching funds and support provided by _____ Corporation".

Advertisement preparation (see Block 38) also includes selecting one of a number of desired backgrounds by using an input apparatus, such as mouse 16 on the user terminal 2, 4, to select among multiple background patterns being displayed. Choices may include regular and premium placement. For example, an advertiser may choose the "Gold" background at a higher cost to show their higher degree of support for the organization. Advertisement preparation (see Block 38) may also include selecting font, font size, and color as is known in the art. For example, an advertiser may choose to have white letters in an Ariel font size of 14. Other variations of advertisement preparation are known in the publishing art and will not be further described herein.

Further, it may be possible to select an advertisement theme so that the number of choices that an advertiser has to make in order to compose an advertisement is reduced. For example, a predefined advertisement theme such as "Formal," "Sponsor," "Endower," or "President's Level" may define a message, layout, background and lettering font or size. Further, the cost associated with predefined advertisement themes may commensurate with various levels of giving. Further, an advertiser may input multimedia comprising graphics, logos, images, video clips, audio clips and audio-visual to the advertisement. For example, a photograph input by use of a camera (not illustrated in FIG. 2) may be used as part of the advertisement. If an advertiser wishes to use a previously designed advertisement or image, or revise a past ad or image, then the advertiser may select an image or prepared advertisement from a list of images or prepared advertisements or from an archive of images or past ads 84 which may be stored at the "ad-book" server 6. The "ad-book" server 6 may maintain archives classified according to a criterion, e.g. organization's name, organization's type, advertiser's name. Once the advertisement has been prepared, it may be displayed to the advertiser so that further changes or editing may be made or for final proof-reading and approval. Shown in FIG. 1 is an example advertisement 46 prepared by selecting choices from the "ad-book" server 6 and shown on the monitor of the user terminal 4.

The "ad-book" server 6 may also generate messages to the user terminal 4. Messages that may be generated include suggesting modifications to an ad, reminding an advertiser to "up-sell" or renew, informing the advertiser of potential "ad-books", prints and publications to advertise in, and promoting an advertiser to remain an ad. The "ad-book" server 6 may use up-selling sales techniques and user history or demographic information to suggest specialty "ad" placement. For example, the server 6 may maintain a database of user history or demographic information and "ad-book" characteristics that may be analyzed to form recommendations regarding potential advertiser interest or history of giving or placing past "ads" or messages. For example, the server 6 may suggest that an advertiser place an "ad" on a particular date in an "ad-book" calendar or the server 6 may suggest that an advertiser place an "ad" alongside specific members.

Data processing occurs as advertisement preparation is completed (see block 40). Since many advertisements and many ad-books may be processed at the "ad-book" server 6, data processing includes classifying each advertisement received into individual ad-books (or multiple ad-books if so desired). For example, Bob's Garage may prepare and transfer an advertisement showing its support for the local girls' softball team to the "ad-book" server 6. The "ad-book" server 6 may classify the advertisement for inclusion in the softball team ad-book. Yet another example, a Chicago-area fast food restaurant may support several causes and wish to be included in many different ad-books. "ad-book" server 6 may classify the fast food restaurant advertisement for a homeless society ad-book, a legal clinic "ad-book" and a church affiliated ad-books.

An embodiment of this invention allows one advertiser to support many organizations. For example, a regional or national advertiser wishing to support all such organizations that meet the advertiser's demographic, advertising or sponsorship criteria or corporate philosophy may designate its support by selecting all relevant ad-books for all relevant organizations. In a more specific example, a major cosmetic company may wish to support women's organizations, including girl's sports teams, women's health issues, and women's charities within its major markets. In yet another example, a major sporting goods supplier may wish to sponsor all youth sport teams or just those in a particular sport. Being able to support many organizations is a benefit of an embodiment of this invention. Pooling support for various organizations together provides efficiency in securing advertisements from an advertiser or advertisers which no one organization could reach and no such advertising campaign could reach so many organizations. Further, pooling support from advertisers, through this invention, allows each advertiser to efficiently offer support to many organizations and allows each organization to discreetly and confidentially accept or reject such support as could be dictated by the consensus of the organization (since it is implied that organizations have a conscience where as for-profit publications would accept any decent paying ad). Thus, both advertisers and organizations benefit from using an embodiment of this invention if successfully deployed to a plethora of advertisers and a plethora of organizations.

In an alternate embodiment, data processing (see Block 40) includes the step of processing a mode of payment for placing the advertisement in an ad-book. For example, an advertiser may enter an advertiser's credit card number in a payment area 118 and request that the bill be charged to the credit card. The mode of payment may also include direct bank drafts, a request to be billed, or, as is unique to not-for-profit and charity organizations a "pledge" for future payment or payments over time. Alternatively, a secure payment provider may be selected 122. Once selecting a payment method, the member or supporter may activate a SUBMIT softkey 124 to complete the process or simply print the information for hand-delivery or mailing.

The "ad-book" server 6 may process the payment information to the organization and or send a follow up receipt for tax purposes or billing for payment or reminders for payment of a "pledge". Further, the "ad-book" server 6 may consolidate payment and advertisement information for the advertiser and or the organization. In such a manner, an embodiment of this invention provides assistance with specialized tax issues which many not-for-profit organizations face.

Data processing (see Block 40) may also include sending an acknowledgement to the advertiser at user terminal 2, 4 that prepared the advertisement. The acknowledgement may include transmitting an electronic mail (email) to the advertiser thanking the advertiser for its support. The email may also include specialized accounting information so as to aid with the specialized tax issues mentioned above. The acknowledgement may also include sending a postal mail to or telephoning the advertiser. Further, data processing (see Block 40) may include sending the advertiser a copy of the advertisement as a proof or that may be printed in the "ad-book" or forwarding a copy of an "ad-book" with the advertisement to the advertiser. In an alternative embodiment, data processing (see Block 40) also includes translating the advertisement into Hypertext Markup Language (HTML) format so that the advertisement may be viewed from user terminals 2, 4 connected to the Internet. Where advertisements may be viewed from user terminals 2, 4, the term publishing is used to describe the ability of users at user terminals 2, 4 to view an ad-book. Where advertisement may be viewed from user terminals 2, 4, ad-books may or may not be printed in physical form. Further yet, data processing (see Block 40) may also include managing advertisements and ad-books so that advertisers may include links to preferred web-sites. For example, a hardware advertiser may include a hypertext link to its home page on the Internet. Further, data processing (see Block 40) may also include the step of deleting old advertisements, advertisements not paid for, and old ad-books in the "ad-book" server 6.

In an alternative embodiment, password protection for the advertisements and ad-books may be available to provide security and limit access to the advertisements and the ad-books. Further, a firewall 34 may be included for the "ad-book" server 6 so as to provide security and limit access to the advertisements and the ad-books.

Returning to FIG. 4, advertisement output (see block 42) functions to create ad-books that are distributed by an organization to raise money. This may include printing out a typeset copy of an "ad-book" on the laser printer 32 of the "ad-book" server 6 or it may include sending an electronic copy of the "ad-book" to a print shop so that a large number of copies may be printed on a printing press or, further, to be bound. In an alternative embodiment, advertisement output (see Block 42) also includes displaying advertisements and ad-books to the user terminals 2, 4. Further, electronic versions of the advertisements and ad-books may be viewed by users connecting to the "ad-book" server 6 through communications network 10. In one embodiment, user terminals 2, 4 may view an electronic "ad-book" that has HTML versions of the advertisements.

An embodiment of the present invention may be provided as software, which may be loaded from floppy disks, from a CD-ROM, over a network, or from any other suitable storage media. The software may be loaded onto the hard disk drive of a computer in a manner that is known to those skilled in the art.

FIG. 6 depicts a schematic 200 of the software processors operating within the system of FIG. 1 and using the form of FIG. 5a. As shown, members and supporters may contact a host 50, 52 of the charity or not-for-profit organizations over a first set of connections 202, 204 through the Internet 8. The host 50, 52 may provide links 206 to any of a number of different websites 208 of different charity or not-for-profit groups.

The websites 208 may include the processor 210 with the functionality of the server 6 or provide hyperlinks 206, 204, 216 to a separate server 6. Where the processor 210 contains the functionality of the server 6, then the processor may down load the form 100 to the member or supporter and the member or supporter may create the advertisement using an internal processor 232.

Alternatively, the member or supporter may use the services of a consultant to prepare the advertisement 44 and reference the graphics for retrieval via a IP address 113. In this case, the member or supporter may create a graphics file within a first processor 232 and transfer the file to a processor 234 that converts the file to a format suitable for the "ad-book, print or publication. Another processor 236 may divide the file into first and second forms for on-line and printed formats. Still another processor 238 may perform further graphics adjustments (e.g., add margins, color, etc.) for approval by the member or supporter. Another processor 240 may add text or make other final adjustments.

The advertisement 44 within the form 100 may be received from the member or supporter through links 202, 204, 206. The "ad-book", print or publication may be sent to an in-house printer 212 or sent to a third party printer 214 through links 206, 204, 218. Where the advertisement 44 is retrieved through the IP address 113, retrieval of the advertisement may be through links 204, 206, 242, 244 or 246.

Where processor 210 prepares the "ad-book", print or publication, payment may be obtained via a credit card 220 or bank 222 via links 206, 204, 224, 226. Alternatively, the member or supporter 2, 4 may arrange for payment directly via a processor 228 and links 202 224, 226, 230.

In other embodiments, the server 6 may be operated by a third party. The third party may maintain a database 248 of previous advertisements from members and supporters of charities and not-for-profit organizations. The third party may also maintain its own accounting system 250 for collecting donations from members or supporters of client charities and not-for-profit organizations.

While various embodiments of the invention have been described, it will be apparent to those of ordinary skill in the art that many more embodiments and implementations are possible that are within the scope of this invention.

What is claimed is:

1. A method for preparing charity or not-for-profit organization ad-books, printing or publication used by a recognized not-for-profit organization, such method comprising:

a website of the recognized not-for-profit organization downloading a webpage to a terminal of a supporter of the not-for-profit organization through a communication network;

the supporter activating a contribution softkey on the downloaded webpage;

a charity or not-for-profit organization server downloading a form to the supporter;

the charity or not-for-profit organization server populating the form with a name of the not-for-profit organization and with a plurality of selectable levels of sponsorship of the not-for-profit organization;

the supporter preparing a message in support of the non-for-profit organization including selecting one of the plurality of levels of sponsorship at the user terminal connected to the communications network; and a processor of the charity or not-for-profit organization server connected to the communications network receiving the message through the communication network and processing the message for placing the message in a charity or not-for-profit organization ad-book or related print or publication.

2. The method of claim 1 wherein preparing further comprises selecting choices relating to the message.

3. The method of claim 2 wherein choices comprises message, size, placement, color, font, logo, image, price, background and layout.

4. The method of claim 2 wherein choices comprises indicating whether the message shall be printed in a physical charity or not-for-profit organization "ad-book" or similar print publication or posted on-line in a virtual charity or not-for-profit organization "ad-book" or similar internet publication or both physically printer and posted on-line or none of the above, where the message is simply rendered "anonymous".

5. The method of claim 1 wherein preparing further comprises selecting a message type or theme to reduce the number of choices that an user, member or sponsor must make to produce a message in support of the non-for-profit organization.

6. The method of claim 1 wherein the communications network comprises a public switch telephone network and packet data network.

7. The method of claim 1 wherein the user terminal comprises a computer system.

8. The method of claim 7 wherein the computer system comprises one of a personal computer, a notebook computer, a personal digital assistant (PDA), a cellular telephone or a mobile/wireless assistant.

9. The method of claim 1 wherein the charity or not-for-profit organization server comprises a web server computer system for accessing the communications network.

10. The method of claim 9 wherein the charity or not-for-profit organization server comprises a firewall for maintaining security including security from outside access to the system and security within the system between various clients, organizations, members, supporters, lists and accounts.

11. The method of claim 10 wherein the firewall limits access to information on the server wherein information comprises the messages and the charity or not-for-profit organization ad-books and the organizations and the users and the members and the supporters and the lists and accounts.

12. The method of claim 1 wherein preparing further comprises using computer software running at the user terminal to create a message.

13. The method of claim 12 wherein the computer software comprises at least one of Microsoft Word or Office, Corel PageMaker and Adobe Acrobat or PhotoShop or then most current and or appropriate commercially available software applicable for the related fields of this invention.

14. The method of claim 1 wherein processing further comprises receiving payment for processing the message for placement in a charity or not-for-profit organization "ad-book" or related print or publication.

15. The method of claim 1 wherein processing further comprises:
receiving the message at the server from the user terminal;
storing the message at the server; and
converting the received message into format to be placed into a charity or not-for-profit organization "ad-book" or related print or publication.

16. The method of claim 15 further comprising receiving payment at the server for processing the message for placement in a charity or not-for-profit organization "ad-book" or related print or publication.

17. The method of claim 15 further comprising classifying the received message into an a charity or not-for-profit organization "ad-book" category.

18. The method of claim 15 further comprising using techniques, the techniques comprising statistics and demographics, to discern at least one group of related messages.

19. The method of claim 15 further comprising using techniques, the techniques comprising statistics and demographics, to discern at least one group of related users, members or supporters.

20. The method of claim 15 further comprising using techniques, the techniques comprising statistics and demographics, to discern at least one group of related charity or not-for-profit organization ad-books or related print or publications.

21. The method of claim 15 further comprising converting the received message into an HTML format to be shown on at least one user terminal.

22. The method of claim 21 wherein the HTML message is a part of an electronic charity or not-for-profit organization "ad-book" or related print publication or charity or not-for-profit organization "ad-book" form for processing a message.

23. The method of claim 21 further comprising sending a copy of the HTML message to user or organization whom initiated or solicited the message preparation.

24. The method of claim 1 further comprising registering with the server whereby user at the user terminal connects to the charity or not-for-profit organization server and enters information relating to the user.

25. The method of claim 1 further comprising entering a mode of payment at the user terminal to pay for the message to be placed in the charity or not-for-profit organization "ad-book" or related print or publication.

26. The method of claim 1 further comprising sending an acknowledgement to an user, member or supporter notifying the organization or user of the receipt of the message.

27. The method of claim 1 further comprising sending an acknowledgement to an user, member or supporter notifying the member, supporter or user of payment information.

* * * * *